(12) United States Patent
Lu et al.

(10) Patent No.: US 10,713,414 B2
(45) Date of Patent: Jul. 14, 2020

(54) WEB PAGE DISPLAY METHOD, TERMINAL, AND STORAGE MEDIUM

(71) Applicant: Tencent Technology (Shenzhen) Company Limited, Shenzhen (CN)

(72) Inventors: Jinggang Lu, Shenzhen (CN); Xiaohai Wei, Shenzhen (CN); Dongsheng Niu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/673,662

(22) Filed: Aug. 10, 2017

(65) Prior Publication Data

US 2017/0337162 A1   Nov. 23, 2017

Related U.S. Application Data

(63) Continuation of application No. PCT/CN2016/085595, filed on Jun. 13, 2016.

(30) Foreign Application Priority Data

Jul. 9, 2015  (CN) .......................... 2015 1 0400225

(51) Int. Cl.
*G06F 40/106* (2020.01)
*G06F 16/958* (2019.01)
(Continued)

(52) U.S. Cl.
CPC ........ *G06F 40/106* (2020.01); *G06F 16/9577* (2019.01); *G06F 16/986* (2019.01); *G06Q 30/0277* (2013.01)

(58) Field of Classification Search
CPC ............. G06F 17/212; G06F 17/30896; G06F 17/30905; G06Q 30/0277
See application file for complete search history.

(56) References Cited

U.S. PATENT DOCUMENTS 6,311,185 B1   10/2001  Markowitz et al.
6,314,451 B1 *  11/2001  Landsman ............. G06Q 30/02
                                                709/203
(Continued)

FOREIGN PATENT DOCUMENTS

CN    101556609 A    10/2009
CN    101894139 A    11/2010
(Continued)

OTHER PUBLICATIONS

International Search Report and Written Opinion dated Sep. 14, 2016 for PCT Application No. PCT/CN2016/085595 (English and Chinese language) (14 pp.).

(Continued)

*Primary Examiner* — Scott T Baderman
*Assistant Examiner* — Seung Woon Jung
(74) *Attorney, Agent, or Firm* — Brinks Gilson & Lione

(57) ABSTRACT

A web page display method is disclosed. The method includes sending by a terminal device having a processor and a memory, a web page access request to a first server, and obtaining a first web page data sent by the first server in response to the web page access request, wherein the memory stores computer readable instructions executed by the processor; obtaining second web page data from a second server that is different from the first server; displaying the first web page data by using a first software application component running by the processor; and displaying the second web page data by using a second software application component running by the processor that is independent of the first software application component, wherein the first web page data and the second web page data being displayed in a single integral web page view.

9 Claims, 5 Drawing Sheets

(51) Int. Cl.
G06F 16/957 (2019.01)
G06Q 30/02 (2012.01)

(56) References Cited

U.S. PATENT DOCUMENTS

| | | | |
|---|---|---|---|
| 6,317,761 B1 | 11/2001 | Landsman et al. | |
| 2002/0032701 A1* | 3/2002 | Gao | G06F 17/30902 715/240 |
| 2005/0033641 A1* | 2/2005 | Jha | G06Q 30/02 705/14.53 |
| 2008/0168388 A1* | 7/2008 | Decker | G06F 3/0481 715/800 |
| 2015/0100914 A1* | 4/2015 | Guan | G06F 3/0481 715/781 |
| 2016/0139765 A1* | 5/2016 | Jeon | G09G 5/14 715/790 |
| 2016/0371751 A1* | 12/2016 | Cohen | G06Q 30/0277 |

FOREIGN PATENT DOCUMENTS

| | | |
|---|---|---|
| CN | 103019538 A | 4/2013 |
| CN | 103425794 A | 12/2013 |
| CN | 103488480 A | 1/2014 |
| CN | 103501343 A | 1/2014 |
| CN | 103678307 A | 3/2014 |

OTHER PUBLICATIONS

Office Action dated May 27, 2019 for Chinese Application No. 201510400225.0 with concise English Translation, 8 pages.

* cited by examiner

WEB PAGE DISPLAY METHOD, TERMINAL, AND STORAGE MEDIUM

CROSS REFERENCE TO RELATED APPLICATIONS

This application is a continuation of International Patent Application PCT/CN2016/085595 filed Jun. 13, 2016, which claims priority to Chinese Patent Application No. 201510400225.0, entitled "WEB PAGE DISPLAY METHOD AND TERMINAL DEVICE", filed with the Chinese Patent Office on Jul. 9, 2015, both of which are incorporated herein by reference in their entirety.

FIELD OF THE TECHNOLOGY

The present disclosure relates to the field of communications technologies, and in particular, to a web page display method, a terminal device, and a storage medium.

BACKGROUND OF THE DISCLOSURE

Presentation of a web page relies on supplementation by a browser kernel and data transmission. When presenting an original web page, a browser sometimes needs to display the web page by supplementing the web page with some other data information such as prompt information. The prompt information may be common informative or may be advertising information or the like.

Currently, a common implementation includes after obtaining original web page data, inserting prompt information into the original web page data, and then performing display of the webpage with the inserted information by using a browser.

In the foregoing solution, because the original web page data need to be modified, but data of many web page may be protected from being modified, display of supplemental information may fail.

SUMMARY

Embodiments of the present disclosure provide a web page display method, a terminal device, and a storage medium, for interpolating information without modifying original web page data.

A web page display method, including:

sending a web page access request to a first server, and obtaining requested first web page data from the first server;

obtaining second web page data from a second server that is different from the first server;

displaying the first web page data by using a first component; and displaying the second web page data by using a second component that is independent of the first component, the first web page data and the second web page data being displayed in a same web page.

A terminal device, including:

a data obtaining unit, configured to send a web page access request to a first server, obtain requested first web page data from the first server, and obtain second web page data from a second server that is different from the first server; and a display control unit, configured to display the first web page data by using a first component, and display the second web page data by using a second component that is independent of the first component, the first web page data and the second web page data being displayed in a same web page.

A non-volatile memory, storing computer readable instructions. When the instructions are executed, a computer is caused to execute the foregoing web page display method.

It could be seen from the foregoing technical solution, the embodiments of the present disclosure has the following advantages: two components are independent of each other, and are separately configured to display first web page data or second web page data for which the components are separately responsible, and the second web page data may be interpolated without modifying the first web page data to display a web page, thereby avoiding a problem that second web page data cannot be interpolated because first web page data needs to be modified.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some exemplary embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure more clear, the present disclosure is further described below in detail with reference to the accompanying drawings. The embodiments to be described are only a subset rather than all potential embodiments of the present disclosure. All other embodiments that may be derived by a person skilled in the art based on the embodiments of the present disclosure without creative efforts shall fall within the protection scope of the present disclosure.

Figure 1A:
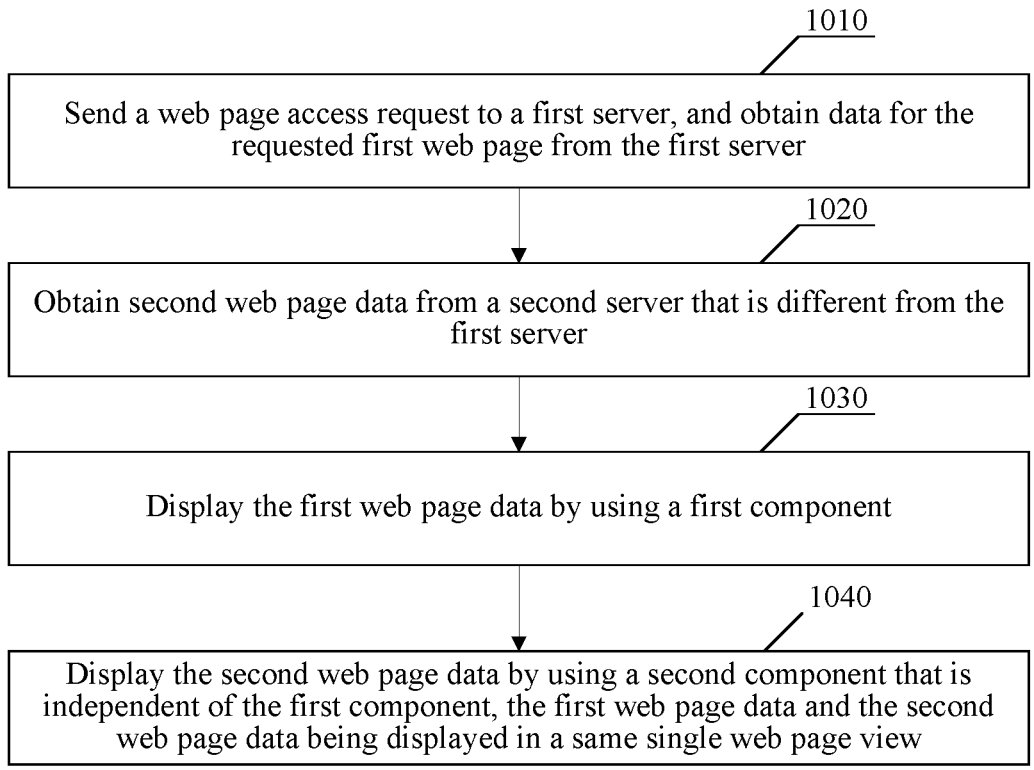
FIG. 1A is a flowchart of a method according to an embodiment of the present disclosure.

According to an embodiment of the present disclosure, a web page display method is provided, as shown in FIG. 1A.

Step 1010: Send a web page access request to a first server, and obtain data for the requested first web page from the first server.

According to some implementations, the first server returns the first web page data in response to the web page access request. The first server may be a webserver. The request may be sent from a terminal device.

Step 1020: Obtain second web page data from a second server that is different from the first server.

A person skilled in the art may understand that the first web page data and the second web page data may include text, an image, audio, a video, an animation and other content (alone or in any combination thereof) embedded in, e.g., a HTML file, specified by a web page style. The web page data may enable a terminal application, such as a browser, to present a web page by using the webpage style. In particular, according to some implementations, the second web page data may be data for displaying an advertisement and other supplemental information.

Step 1030: Display the first web page data by using a first component.

The first component (or other components described later) used herein may include or encapsulate a program element for implementing and providing a program interface in a system. A component may be alternative referred as a software component or software application component. Each of these component may further contain other software components or subcomponents. The component may implement a specific function and may include software code (source code, binary code, or executable code) or some similar content such as a script or a command file. In one implementation, the component may implement a web page display function. Alternatively or additionally, the component may also implement other functions.

Step 1040: Display the second web page data by using a second component that is independent of the first component, the first web page data and the second web page data being displayed as if they were in a same single web page.

In the embodiment of this application, the first web page data and the second web page data are from different servers and may have different presentation styles. By respectively presenting the first web page data and the second web page data by using the first component and the second component that are independent of each other, the first web page data and the second web page data that are from different servers may be integrally displayed in a same single web page view without modifying the first web page data. The single integral web page view may include both the first webpage data and the second web page data displayed separately without overlap but without apparent or viewable border separating them.

In the embodiment of this disclosure, the first web page data and the second web page data may be displayed simultaneously or not simultaneously. For example, in a process of displaying the first web page data, it may be detected that the second web page data from a second server needs to be displayed, and then, the second web page data is obtained from the second server and displayed by using a second component together with the first webpage while the first webpage has already been displayed.

Figure 1B:
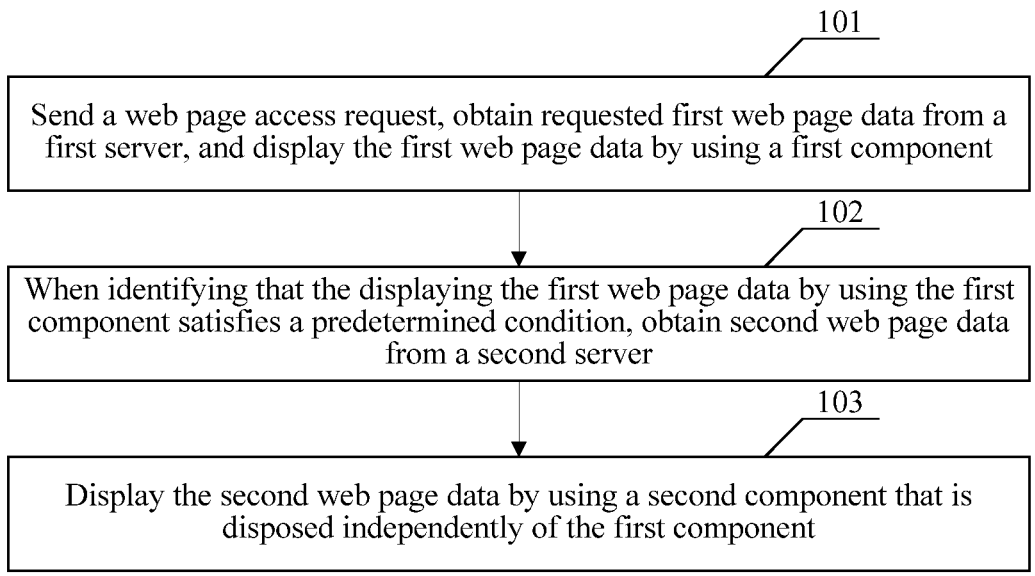
FIG. 1B is a flowchart of a method according to another embodiment of the present disclosure.

Another embodiment of the present disclosure provides a web page display method, as shown in FIG. 1B, including the following steps:

101: Send a web page access request, obtain requested first web page data from a first server, and display the first web page data by using a first component.

The functions of this embodiment may be implemented by an application (APP), such as a browser (an execution body), in a terminal device. Alternatively, the execution body may also be another APP, such as WeChat (from Tencent), that can be configured to request for displaying a web page. No limitation is imposed in the present disclosure with respect to the execution body for the functions above. The first server may be a server that provides web page data and generally, may be a web page server or a webserver. The first web page data comprises original web page data to which no second web page data has been added. The second web page data may be any web page data including advertising page data or informative information, and no limitation is imposed in the embodiment of the present disclosure with respect to the content of the first and second webpages.

The display of the first web page data by the APP in this step may be delayed and performed together later when displaying the second web page data. As such, step 101 may alternatively only include sending the web page access request and obtaining the requested first web page data. The display of the first web page data by using the first component may accordingly be performed with step 103. Therefore, it should not be understood as that this displaying step should be performed before the second web page data is obtained.

102: When identifying that the displaying the first web page data by using the first component satisfies a predetermined condition, obtain second web page data from a second server.

In this embodiment, the second web page data may be data information that a device other than web page server needs to display together with the first web page data when the first web page data is displayed, and does not need to belong to data information provided by any web page server. The second web page data may be provided by a terminal device, for example, be provided locally from the terminal device, or by a service provider of the APP running on the terminal device or be sourced from a server corresponding to the APP (e.g., an application server), and a specific source of the second web page data thereof is not limited in the embodiment of the present disclosure. The second server is a server that provides second web page data, and generally, may be a terminal server, application server, or another server capable of providing data. Different servers may be deployed according to different application scenarios and system architectures, and a specific server type of the second server is not limited in the embodiment of the present disclosure.

103: Display the second web page data by using a second component that is instantiated independently of the first component.

In this embodiment, "first" and "second" are merely used for distinguishing two different functional components or servers, and the two components above are independent of each other, and are separately configured to display first web page data or second web page data for which the components are separately responsible, so that the second web page data may be inserted to supplement the display of the first web page without modifying the first web page data.

In some examples of implementations, the component may be a WebView component. The WebView is a system component used by Android and IOS platforms to parse and present a web page, and may serve as a preferred implementation for parsing and presenting a web page in the embodiment of the present disclosure. Using another component having functions of parsing and presenting web page data is also acceptable, and no limitation is imposed in the embodiment of the present disclosure in this respect.

An embodiment of the present disclosure further provides a specific process of determining that there is a need to display the second web page data. Specifically, step 102 (when identifying that the displaying the first web page data by using the first component satisfies a predetermined condition, obtaining second web page data from a second server) may include:

if determining, by the first component when displaying the first web page data, that there is a need to display the second web page data, sending a request to the second component; and after receiving the request, sending, by the second component, a data request message for supplemental information to the second server, and then, receiving the second web page data from the second server.

This embodiment further provides specific solutions of determining the second web page data as follows: an identifier of the second web page data is specified in the request for supplemental information; or the second web page data is web page data determined by the second server after the server receives the request for supplemental information.

In the former solution, the first WebView component determines second web page data that is needed and includes the identifier for the second web page data in the request for supplemental information. In the latter solution, the request for supplemental information may be a general request optionally specified with general preference for supplemental information (such as type of advertisement, or type of content of the first web page), and the second web page data may be determined by a second server, and generally, may be determined by a service provider of the APP based on the request for supplemental information. As such, the second web page data that is inserted to supplement he first web page data may be controlled conveniently and flexibly.

Because in the embodiment of the present disclosure, the two independent components are configured to display a single web page view, the two web pages need to be tiled integrally. The embodiment of the present disclosure provides the following solution: before displaying the first web page data by using a first component and displaying the second web page data by using a second component that is independent of the first component, the method further includes:

determining a display tiling rule for integrating the first web page data and the second web page data, where displaying the first web page data by using a first component includes displaying the first web page data according to the display tiling rule by using the first component; and displaying the second web page data by using a second component that is independent of the first component, including displaying the second web page data according to the display tiling rule by using the second component that is independent of the first component.

Based on subordination of the second web page data, the second web page data may be displayed in a corresponding subordinate area or position, and sometimes, a user may not slide a cursor, scroll, or use a sliding or other touch actions on a touch panel of the terminal device to slide to or create the subordinate display area or position of the second web page data. Therefore, to avoid unnecessary data transfer of the second web page data, some embodiment of the present disclosure may be specifically as follows:

the second web page data is to be displayed in a subordinate area as a supplemental information of the first web page data;

when an instruction, e.g., a sliding of a cursor, scroll, or use a sliding or other touch actions on a touch panel of the terminal device to indicate, slide to, or create the subordinate display region corresponding to the second web page data, is received, it is determined that there is a need to display the second web page data. Only then would the second web page data is transmitted from the second server to the terminal device.

Figure 2:
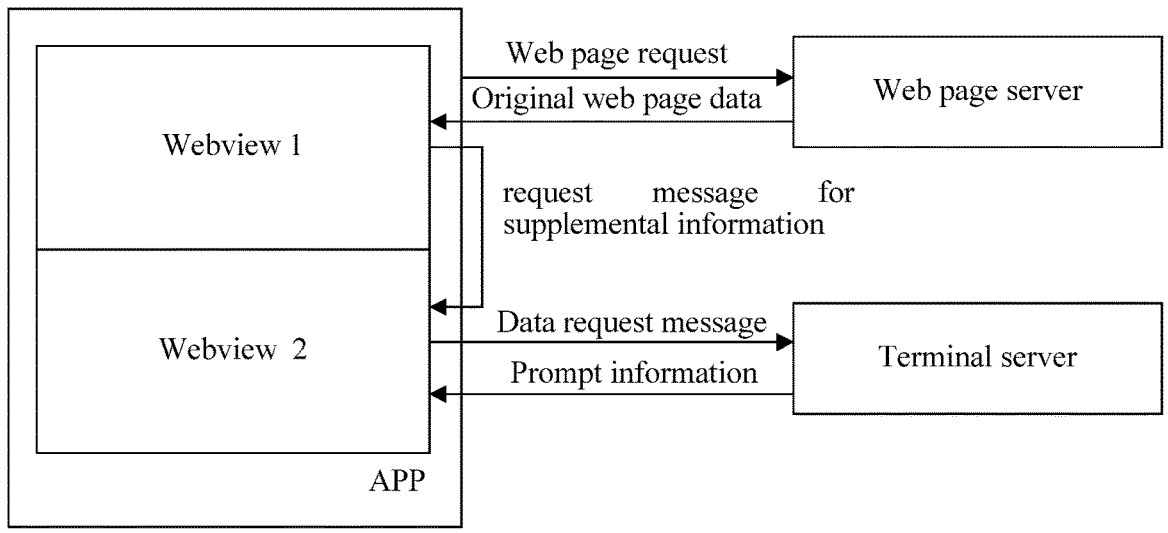
FIG. 2 is a functional and structural block diagram of a system according to an embodiment of the present disclosure.
Figure 3:
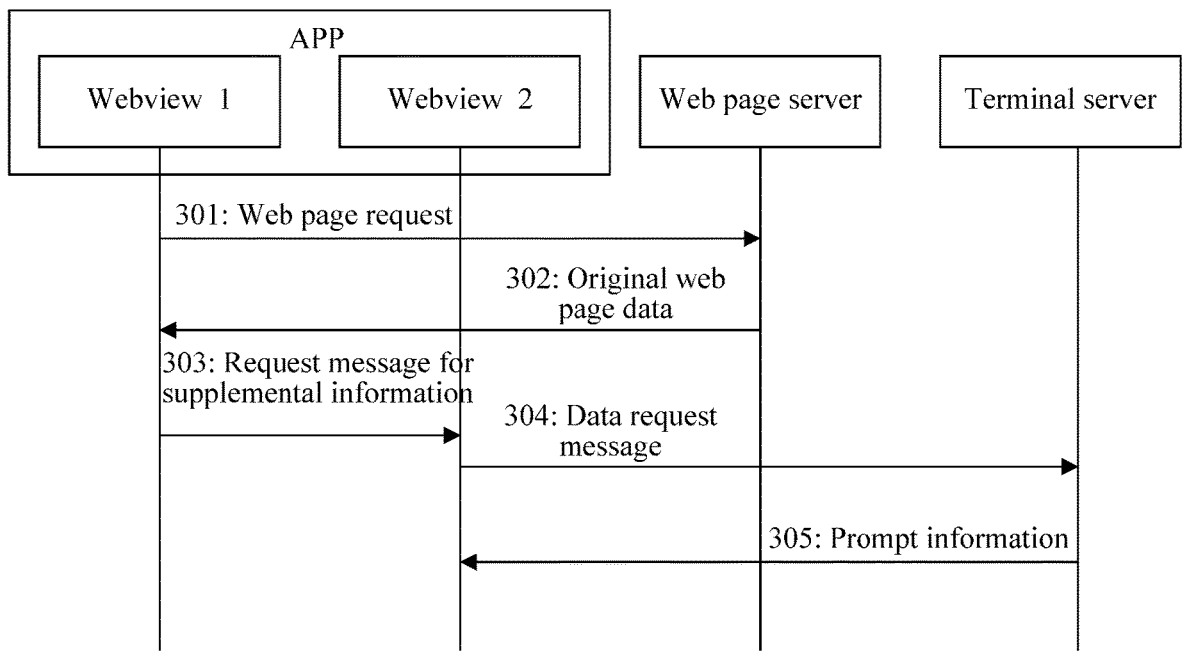
FIG. 3 is a flowchart of a method according to an embodiment of the present disclosure.

FIG. 2 is an exemplary schematic diagram of a system architecture using an example in which the APP is a browser. FIG. 3 shows a flowchart of a method corresponding to FIG. 2. In this embodiment, it is assumed that the to-be-inserted or supplemented second web page data is page data of an advertisement.

In this embodiment, presentation of the webpages is performed by using a dual-WebView architecture. Therefore, WebView content or data of an original web page is not modified, and a presentation style of the original web page is also not changed. In this solution, two separate network data requests is used, so that no content is added into the original web page data. This implementation may reduce a legal risk related to mingling web page data and carrying advertisement in the first webpage data and may also ensure normal display of the supplemental advertisement. A specific process is as follows:

301: An APP sends a web page request to a web page server.

302: The web page server returns first web page data to Webview 1.

At this time, Webview 1 may directly display the first web page data, and display may be performed together after step 305, as discussed above.

303: Webview 1 determines that an advertisement needs to be carried or supplemented and sends a request message for supplemental information to Webview 2.

304: After receiving the request message for supplemental information, Webview 2 sends a data request message to a terminal server.

305: After receiving the data request message, the terminal server returns second web page data, that is, advertising information, to Webview 2. After receiving the advertising information, Webview 2 may perform tiling according to a tiling rule.

Figure 4A:
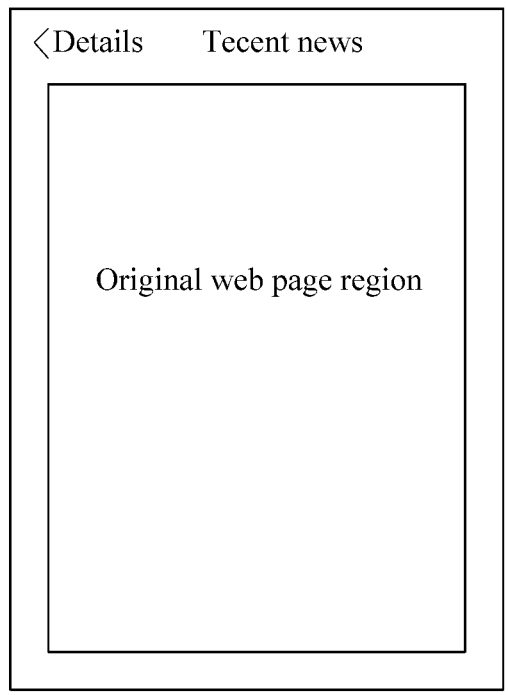
FIG. 4A shows a display interface according to an embodiment of the present disclosure.
Figure 4B:
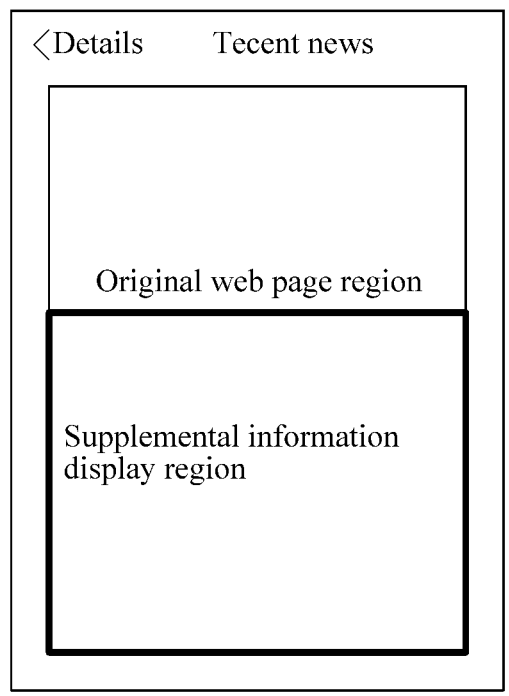
FIG. 4B shows a display interface according to another embodiment of the present disclosure.

FIG. 4A shown an display interface of an original web page on the terminal device that opened in a first step, and FIG. 4B shows an interface displaying a carried or supplemental advertisement in a second step.

In the first step: using the Webview interface of the APP to open an original web page (the first webpage data).

In the second step: after the web page view for the first webpage data is dragged to a bottom or a supplemental display region (via, e.g., a touch action on a touch panel over the display screen), a carried or supplemental advertisement is displayed, where a black bold block part is an advertisement display region (supplemental region).

With reference to FIG. 3, the APP first creates Webview 1 to present original web page data.

Then, the APP initiates a request for obtaining original web page data, the web page server returns the original web page data, and the APP presents the original web page data in Webview 1.

According to a policy, if a carried or supplemental advertisement needs to be displayed, the APP may create Webview 2 to display the advertisement.

The APP initiates a request message for supplemental information, the terminal server returns advertisement data, and the APP presents advertising data in Webview 2.

In the foregoing process, the APP controls an overall tiling of the double WebViews, and in terms of presentation, the APP may simulate a presentation effect of a single webpage view showing both the original webpage and the supplemental advertisement in an integrated rather than separated presentation. As such, there first web page and the second web page (advertisement) appears together as if they belonged to a same web page while the first web page is not modified to include the advertisement content. It is preferable that the original webpage and the supplemental advertisement do not overlap in the integrated view.

Figure 5:
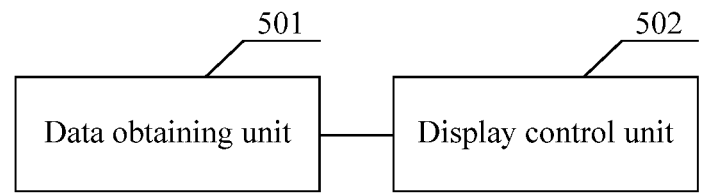
FIG. 5 shows a schematic structural diagram of a terminal device according to an embodiment of the present disclosure.

An embodiment of the present disclosure further provides a terminal device, as shown in FIG. 5, including:

a data obtaining unit 501, configured to send a web page access request to a first server, obtain requested first web page data from the first server, and obtain second web page data from a second server that is different from the first server; and a display control unit 502, configured to display the first web page data by using a first component, and display the second web page data by using a second component that is independent of the first component, the first web page data and the second web page data being displayed in a same single web page view.

In this embodiment, the first server is a server that provides web page data and generally, may be a web page server. The first web page data is web page data to which no second web page data has been added. The second web page data may be data information that a device other than web page server needs to display together with the first web page data when the first web page data is displayed, and may not belong to data information provided by the web page server. The second web page data may be any information including advertising page data. The second web page data may be provided by a terminal device, for example, be provided locally from the terminal device, or by a service provider of the APP running on the terminal device or be sourced from a server corresponding to an APP (e.g., an application server), and a specific source of the second web page data thereof is not limited in the embodiment of the present disclosure.

In this embodiment, "first" and "second" are merely used for distinguishing two different functional components or servers, and the two components above are independent of each other, and are separately configured to display first web page data or second web page data for which the components are separately responsible, so that the second web page data may be inserted to supplement the display of the first web page without modifying the first web page data, thereby avoiding a problem that second web page data cannot be interpolated because first web page data needs to be modified.

The WebView is a system component used by Android and IOS platforms to parse and present a web page, and may serve as an implementation of a component for parsing and presenting a web page in the embodiment of the present disclosure. Using another component having functions of parsing and presenting web page data is also acceptable, and no limitation is imposed in the embodiment of the present disclosure in this respect.

An embodiment of the present disclosure further provides a specific process of determining that there is a need to display the second web page. The foregoing data obtaining unit 501 is configured to, if determining, by the terminal device, when displaying the first web page data by using the first component, that there is a need to display the second web page data, send a request for supplemental information to the second component in the terminal device, so that after receiving the request for supplemental information, the second component sends a data request message to the second server, and then, receives the second web page data.

This embodiment further provides a specific solution of determining the second web page data as follows: an identifier of the second web page data is specified in the request for supplemental information; or the second web page data is data determined by the second server after the server receives the request for supplemental information.

In the former solution, the first WebView determines the second web page data that is needed and includes the identifier for the second web page data in the request for supplemental information. In the latter solution, the request for supplemental information may be a general request optionally specified with general preference for supplemental information (such as type of advertisement, or type of content of the first web page), and the second web page data may be determined by a second server, and generally, may be determined by a service provider of the APP based on the request for supplemental information. As such, the second web page data that is inserted to supplement the first web page data may be controlled conveniently and flexibly.

Figure 6:
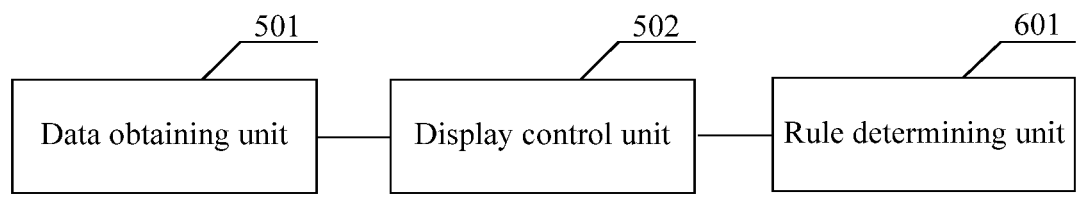
FIG. 6 shows a schematic structural diagram of a terminal device according to another embodiment of the present disclosure.

Because in the embodiment of the present disclosure, two independent components are configured to display a single web page view, the two web pages need to be tiled integrally. The embodiment of the present disclosure provides the following solution: as shown in FIG. 6, the terminal device further includes:

a rule determining unit 601, configured to determine a tiling rule for integrating the first web page data and the second web page data before displaying the first web page data by using the first component and displaying the second web page data by using the second component; and the display control unit 502, configured to display the first web page data according to the display tiling rule by using the first component; and display the second web page data according to the display tiling rule by using the second component that is independent of the first component.

Based on subordination of the second web page data, the second web page data may be displayed in a corresponding subordinate area or position, and sometimes, a user may not slide a cursor, scroll, or use a sliding or other touch actions on a touch panel of the terminal device to slide to or create the subordinate display area or position of the second web page data. Therefore, to avoid unnecessary data transfer of the second web page data, the embodiment of the present disclosure may be specifically as follows: the tiling rule may be that the second web page data is to be displayed in a subordinate area as supplemental information of the first web page data.

The data obtaining unit 501 is configured to, when receiving an instruction, e.g., sliding of a cursor, scroll, or use a sliding or other touch actions on a touch panel of the terminal device to indicate, slide to, or create the subordinate display region or area corresponding to the second web page data, determine that there is a need to display the second web page data. Only then would the second web page data is transmitted from the second server to the terminal device.

Figure 7:
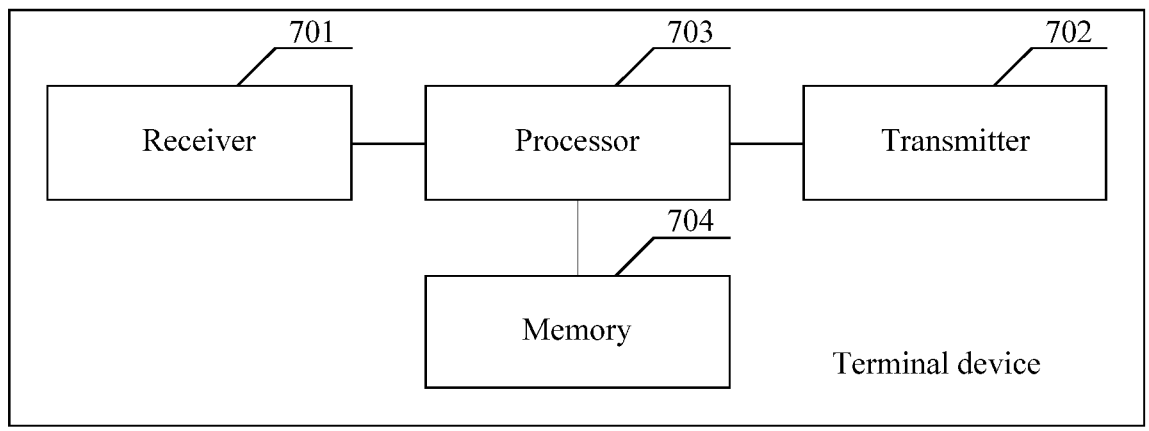
FIG. 7 shows a schematic structural diagram of a terminal device according to another embodiment of the present disclosure.

An embodiment of the present disclosure further provides another terminal device, as shown in FIG. 7, including: a receiver 701, a transmitter 702, a processor 703, and a memory 704.

The processor 703 is configured to control execution of: sending a web page access request, and obtaining requested first web page data from a first server, and displaying the first web page data by using a first component; when identifying that the displaying the first web page data by using the first component satisfies a predetermined condition, obtaining second web page data from a second server; and displaying the second web page data by using a second component that is independent of the first component.

In this embodiment, the first server is a server that provides web page data and generally, may be a web page server. The first web page data is web page data to which no second web page data has been added. The second web page data may be data information that a device other than web page server needs to display together with the first web page data when the first web page data is displayed, and may not belong to data information provided by the web page server. The second web page data may be any informative information including advertising page data. The second web page data may be provided by a terminal device, for example, be provided locally from the terminal device, or by a service provider of the APP running on the terminal device or be sourced from a server corresponding to an APP (e.g., an application server), and a specific source of the second web page data thereof is not limited in the embodiment of the present disclosure.

In this embodiment, "first" and "second" are merely used for distinguishing two different functional components or servers, and the two components above are independent of each other, and are separately configured to display first web page data or second web page data for which the components are separately responsible, so that the second web page data may be inserted to supplement the display of the web page without modifying the first web page data, thereby avoiding a problem that second web page data cannot be interpolated because first web page data needs to be modified. The WebView is a system component used by Android and IOS platforms to parse and present a web page, and may serve as a preferential implementation for parsing and presenting a web page in the embodiment of the present disclosure. Using another component having functions of parsing and presenting web page data is also acceptable, and no limitation is imposed in the embodiment of the present disclosure.

An embodiment of the present disclosure further provides a specific process of determining that there is a need to display the second web page data as follows:

the processor 703 may be configured to, when identifying that the displaying the first web page data by using the first component satisfies a predetermined condition, obtain second web page data from a second server includes:

if determining, by displaying the first web page data by using the first component, that there is a need to display the second web page data, sending a request to the second component;

after receiving the request, sending, by the second component, a data request message to the second server, and then, receiving the second web page data.

This embodiment further provides a specific solution of determining the second web page data as follows: an identifier of the second web page data is specified in the request for supplemental information; or the second web page data is second web page data determined by the second server after the server receives the request for supplemental information.

In the former solution, the first WebView determines the second web page data that is needed and includes the identifier for the second web page data in the request for supplemental information. In the latter solution, the request for supplemental information may be a general request optionally specified with general preference for supplemental information (such as type of advertisement, or type of content of the first web page), and the second web page data may be determined by a second server, and generally, may be determined by a service provider of an APP based on the request for supplemental information. As such, the second web page data that is inserted to supplement the first web page data may be controlled conveniently and flexibly.

Because in the embodiment of the present disclosure, two independent components are configured to display a single web page view, the two web pages need to be tiled integrally. The embodiment of the present disclosure provides the following solution: the processor 703 is further configured to control execution of: determining a tiling rule for integrating the first web page data and the second web page data before displaying the first web page data by using the first component and displaying the second web page data by using a second component that is independent of the first component, where the displaying the first web page data by using a first component includes displaying the first web page data according to the tiling rule by using the first component; and the displaying the second web page data by using a second component that is independent of the first component includes displaying the second web page data according to the tiling rule by using the second component that is independent of the first component.

Based on subordination of the second web page data, the second web page data may be displayed in a corresponding subordinate area or position, and sometimes, a user may not slide a cursor, scroll, or use a sliding or other touch actions on a touch panel of the terminal device to slide to or create the subordinate display area or position of the second web page data. Therefore, to avoid unnecessary data transfer of the second web page data, the embodiment of the present disclosure may be specifically as follows: the second web page data is to be displayed in a subordinate area as supplemental information of the first web page data.

Determining that there is a need to display the second web page data includes: receiving an instruction of sliding of a cursor, scroll, or use a sliding or other touch actions on a touch panel of the terminal device to indicate, slide to, or create the subordinate display region or area corresponding to the second web page data. Only then would the second web page data is transmitted from the second server to the terminal device.

Figure 8:
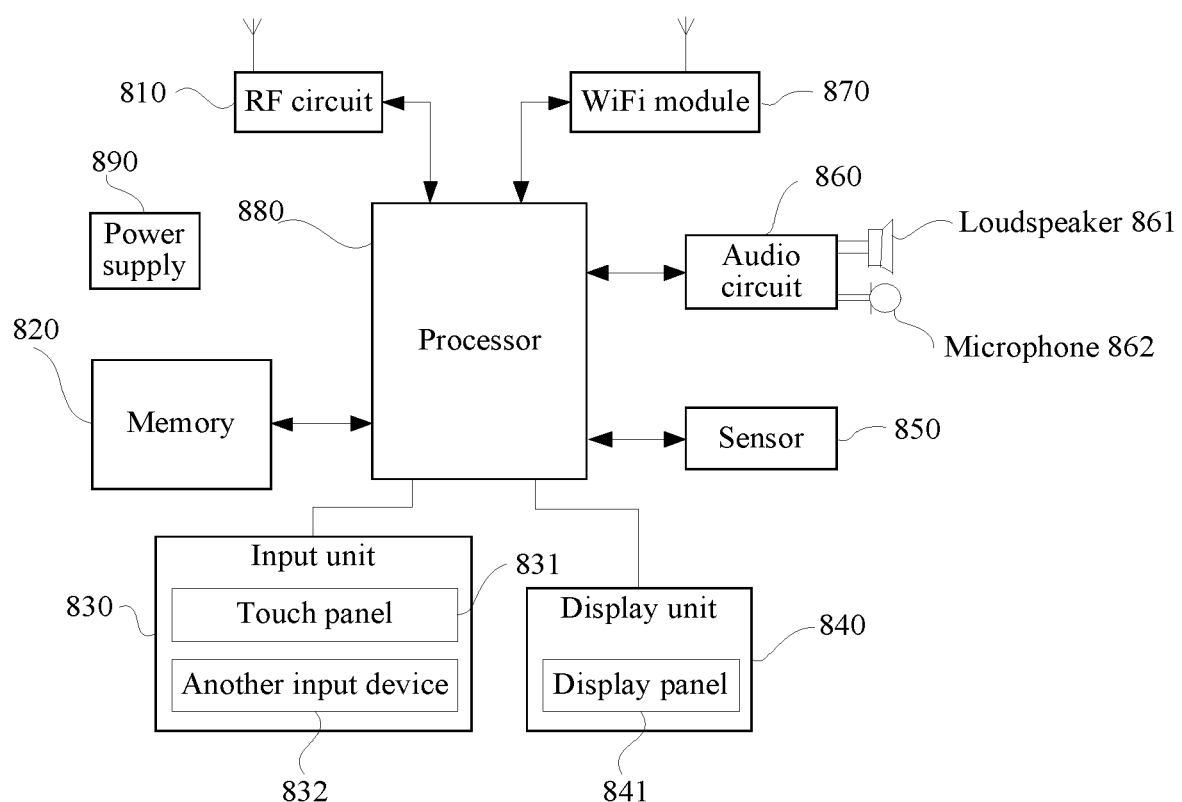
FIG. 8 shows a schematic structural diagram of a terminal device according to yet an embodiment of the present disclosure.

The embodiment of the present disclosure further provides another terminal device, as shown in FIG. 8, and for convenience of description, only parts related to the embodiment of the present disclosure relevant are shown. For specific technical details that are not disclosed, refer to the method part of the embodiments of the present disclosure. The terminal device may be any terminal device including a mobile phone, a tablet computer, a Personal Digital Assistant (PDA), a Point of Sales (POS), and an on-board computer, and the terminal device being a mobile phone is used as an example.

FIG. 8 is a block diagram of a structure of a part of a mobile phone related to a terminal according to an embodiment of the present disclosure. Referring to FIG. 8, the mobile phone includes components such as a radio frequency (RF) circuit 810, a memory 820, an input unit 830, a display unit 840, a sensor 850, an audio circuit 860, a wireless fidelity (Wi-Fi) module 870, a processor 880, and a power supply 890. A person skilled in the art understands that the structure of the mobile phone shown in FIG. 8 does not constitute a limitation to the mobile phone, and the mobile phone may include more components or fewer components than those shown in the figure, or some components may be combined into one component, or a different component deployment and arrangement may be used.

The following specifically describes the components of the mobile phone with reference to FIG. 8.

The RF circuit 810 may be configured to receive and send signals during an information receiving and sending process or a call process. Particularly, the RF circuit 810 receives downlink information from a base station, then delivers the downlink information to the processor 880 for processing, and sends related uplink data to the base station. Generally, the RF circuit 810 includes, but is not limited to, an antenna, at least one amplifier, a transceiver, a coupler, a low noise amplifier (LNA), and a duplexer. In addition, the RF circuit 810 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 820 may be configured to store a software program and module. The processor 880 runs the software program and module stored in the memory 820, to implement various functions, applications, and data processing of the mobile phone. The memory 820 may mainly include a program storage area and a data storage area. The program storage area may store an operating system, an application program required by at least one function (such as a sound playback function and an image display function), and the like. The data storage area may store data (such as audio data and an address book) created when operating the mobile phone=. In addition, the memory 820 may include a high speed random access memory, and may also include a non-volatile memory such as at least one magnetic disk storage device, a flash memory, or another volatile solid-state storage device.

The input unit 830 may be configured to receive input numerical or character information, and generate a keyboard signal input related to the user setting and function control of the mobile phone. Specifically, the input unit 830 may include a touch panel 831 and another input device 832. The touch panel 831, which may also be referred to as a touch screen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. Moreover, the touch controller can receive and execute a command sent from the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the mobile phone. The display unit 840 may include a display panel 841. Optionally, the display panel 841 may include a liquid crystal display (LCD), an organic light-emitting diode (OLED), or the like. Further, the touch panel 831 may be disposed over the display panel 841. After detecting a touch operation on or near the touch panel 831, the touch panel 831 transfers the touch operation to the processor 880, so as to determine the type of the touch event. Then, the processor 880 provides a corresponding visual output on the display panel 841 according to the type of the touch event. Although, in FIG. 8, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone may further include at least one sensor 850 such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an accelerometer may detect magnitude of accelerations in various directions (generally on three axes), may detect magnitude and a direction of the gravity, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 860, a loudspeaker 861, and a microphone 862 may provide audio interfaces between the user and the mobile phone. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile phone by using the RF circuit 810, or outputs the audio data to the memory 820 for further processing.

Wi-Fi is a short distance wireless transmission technology. The mobile phone may help, by using the Wi-Fi module 870, the user to receive and send e-mails, browse a web page, access streaming media, and so on, which provides wireless broadband Internet access for the user. Although FIG. 8 shows the Wi-Fi module 870, it may be understood that the Wi-Fi module 870 is not a necessary component of the mobile phone, and when required, the Wi-Fi module 870 may be omitted as long as the scope of the essence of the present disclosure is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 performs various functions and data processing of the mobile phone, thereby performing overall monitoring on the mobile phone. Optionally, the processor 880 may include one or more processing units. Preferably, the processor 880 may integrate an application processor and a modem. The application processor mainly processes an operating system, a user interface, an application program, and the like. The modem mainly processes wireless communication. It may be understood that the foregoing modem may also not be integrated into the processor 880.

The processor 880 is configured to: send a web page access request to a first server, and obtain requested first web page data from the first server; obtain second web page data from a second server that is different from the first server; display the first web page data by using a first component; and display the second web page data by using a second component that is independent of the first component, the first web page data and the second web page data being displayed in a same web page.

The mobile phone further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the present disclosure, the processor 880 included in the terminal may perform steps in the method of the embodiments of the present disclosure.

According to an embodiment of the present disclosure, a non-volatile memory is further provided, storing computer readable instructions. When executed, the instructions cause the computer to execute the web page display method as shown in FIG. 1A.

It is worth noting that in the embodiment of the terminal device, the included units are divided according to functional logics, and are not limited to the foregoing division as long as corresponding functions can be implemented. In addition, specific names of the functional units are also used to help distinguish the functional units from each other, and are not used to limit the protection scope of the present disclosure.

In addition, a person of ordinary skill in the art may understand that all or some of the steps of the foregoing method embodiments may be implemented by a program instructing relevant hardware. The corresponding program may be stored in a computer readable storage medium. The above-mentioned storage medium may be a read-only memory, a magnetic disk, an optical disc, or the like.

The foregoing descriptions are merely specific preferred implementations of the present disclosure, but are not intended to limit the protection scope of the present disclosure. Variations or replacements readily figured out by a person skilled in the art within the technical scope disclosed in the present disclosure shall all fall within the protection scope of the present disclosure. Therefore, the protection scope of the present disclosure shall be subject to the protection scope of the appended claims.

What is claimed is:

1. A web page display method, comprising:
    sending by a terminal device having a processor and a memory, a web page access request to a first server, and obtaining a first web page data sent by the first server in response to the web page access request, wherein the memory stores computer readable instructions executed by the processor;
    displaying the first web page data on a display screen of the terminal device using a first WebView component; and
    triggered by detecting a user action of dragging the first WebView component to a bottom of the display screen while the first web page data is displayed:
        creating a first display area at the bottom of the display screen;
        sending a general request for supplemental information of the first web page data specifying a general preference for the supplemental information to a second server, wherein the general preference comprises a type of the supplemental information or a type of content of the first web page data;
        obtaining second web page data from a second server that is different from the first server wherein the second web page data is determined by the second server based on the general preference, wherein the first web page data contains no linking reference to the second web page data; and
        displaying the second web page data in the first display area at the bottom of the display screen by using a second WebView component that is independent of the first WebView component, wherein the first web page data and the second web page data are independent, and are displayed simultaneously on the display screen in a manner that simulates displaying the first web page data and second web page data as a single web page view.

2. The method according to claim 1, wherein the second web page data comprises advertisement web page data.

3. The method according to claim 1, wherein sending the general request for supplemental information to the second server comprises:
    sending the general request for supplemental information to the second WebView component; and
    sending, by the terminal device via the second WebView component after receiving the general request for supplemental information, a data request message to the second server.

4. The method according to claim 1, wherein before the second web page data by using a second WebView component that is independent of the first WebView component, the method further comprises determining a display tiling rule for integrating the first web page data and the second web page data, wherein:
    the displaying the second web page data by using the second WebView component that is independent of the first WebView component comprises displaying the second web page data according to the display tiling rule by using the second WebView component that is independent of the first WebView component.

5. A terminal device, comprising a memory, a processor, the memory storing computer readable instructions, the processor, when executing the instructions, is configured to:
    send a web page access request to a first server;
    obtain a first web page data sent by the first server in response to the web page access request;
    display the first web page data on a display screen of the terminal device using a first WebView component; and
    triggered by detecting user action of dragging the first WebView component to a bottom of the display screen while the first web page data is displayed:

create a first display area at the bottom of the display screen;

send a general request for supplemental information of the first web page data specifying a general preference for the supplemental information to a second server, wherein the general preference comprises a type of the supplemental information or a type of content of the first web page data;

obtain a second web page data from a second server that is different from the first server wherein the second web page data is determined by the second server based on the general preference wherein the first web page data contains no reference to the second web page data; and display the second web page data in the first display area at the bottom of the display screen by using a second WebView component running by the processor that is independent of the first WebView component, wherein the first web page data and the second web page data are independent and are displayed simultaneously on the display screen in a manner that simulates displaying the first web page data and second web page data as a single web page view.

6. The terminal device according to claim 5, wherein the second web page data comprises advertisement web page data.

7. The terminal device according to claim 5, wherein the processor, when executing the instructions to send the general request for supplemental information to the second server, is configured to:

send the general request for supplemental information to the second WebView component; and send a data request message to the second server.

8. The terminal device according to claim 5, wherein the processor, when executing the instructions, is further configured to:

determine a display tiling rule of the first web page data and the second web page data before displaying the second web page data by using the second WebView component; and wherein the processor, when executing the instructions to display the first web page data and the second web page data, is configured to display the second web page data according to the display tiling rule by using the second WebView component that is independent of the first WebView component.

9. A non-volatile, computer readable, and non-transitory storage medium, comprising program instructions, the program instructions, when executed by a computer, causing the computer to:

send a web page access request to a first server;

obtain a first web page data sent by the first server in response to the web page access request;

display the first web page data on a display screen of the terminal device using a first WebView component; and triggered by detecting user action of dragging the first WebView component to a bottom the display screen while the first web page data is displayed:

create a first display area at the bottom of the display screen;

send a general request for supplemental information of the first web page data a general preference for the supplemental information to a second server, wherein the general preference comprises a type of the supplemental information or a type of content of the first web page data;

obtain a second web page data from a second server that is different from the first server wherein the second web page data is determined by the second server based on the general preference wherein the first web page data contains no reference to the second web page data; and display the second web page data in the first display area at the bottom of the display screen by using a second WebView component running by the computer that is independent of the first WebView component, wherein the first web page data and the second web page data are independent and are displayed simultaneously on the display screen in a manner that simulates displaying the first web page data and second web page data as a single web page view.

* * * * *

UNITED STATES PATENT AND TRADEMARK OFFICE
CERTIFICATE OF CORRECTION

PATENT NO. : 10,713,414 B2
APPLICATION NO. : 15/673662
DATED : July 14, 2020
INVENTOR(S) : Jinggang Lu, Xiaohai Wei and Dongsheng Niu Page 1 of 1

It is certified that error appears in the above-identified patent and that said Letters Patent is hereby corrected as shown below:

In the Claims

In Column 14, Claim 4, Line 45, insert --displaying-- between the words "before" and "the".

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*